United States Patent [19]
Yano et al.

[11] Patent Number: 5,495,712
[45] Date of Patent: Mar. 5, 1996

[54] VARIABLE DISPLACEMENT TYPE HYDRAULIC SYSTEM

[75] Inventors: Kazuhiko Yano; Shigenori Sakikawa; Ryota Ohashi, all of Amagasaki, Japan

[73] Assignee: Kanzaki Kokyukoki Mfg. Co., Ltd., Amagasaki, Japan

[21] Appl. No.: 261,995

[22] Filed: Jun. 17, 1994

[30] Foreign Application Priority Data

Sep. 17, 1993 [JP] Japan ................................. 5-232009

[51] Int. Cl.$^6$ .............................. F16D 39/00; F01B 3/00
[52] U.S. Cl. ................................................. 60/487; 91/505
[58] Field of Search ............................ 92/12.2; 91/505, 91/506; 60/487, 490, 491, 492

[56] References Cited

U.S. PATENT DOCUMENTS

| 2,272,771 | 2/1942 | Hawley, Jr. | 91/505 |
| 3,422,767 | 1/1969 | McAlvay | 91/505 |
| 3,535,984 | 10/1970 | Anderson | 91/506 |
| 3,631,763 | 1/1972 | Court | 91/506 |
| 3,911,792 | 10/1975 | Heyl et al. | 91/505 |
| 3,933,083 | 1/1976 | Weisenbach et al. | 92/12.2 |
| 3,967,541 | 7/1976 | Born et al. | 91/506 X |
| 4,494,911 | 1/1985 | Davis | 417/222.1 |
| 4,945,817 | 8/1990 | Scholl | 91/505 |
| 5,203,169 | 4/1993 | Ishii et al. | 91/505 X |
| 5,335,496 | 8/1994 | Azuma et al. | 91/505 X |
| 5,438,831 | 8/1995 | Okada | 91/504 X |
| 5,456,068 | 10/1995 | Ishii et al. | 91/505 X |

FOREIGN PATENT DOCUMENTS 61-28062  8/1986  Japan.

*Primary Examiner*—John E. Ryznic
*Attorney, Agent, or Firm*—Sterne, Kessler, Goldstein & Fox

[57] ABSTRACT

A variable displacement type hydraulic system is contained in a housing. A guide is provided on an axis of slanting movement of a swash plate. The guide is fitted into an inner ring of a roller bearing. The roller bearing is fitted into a groove formed at an inner wall of the housing and a groove formed at a cylinder block mounting surface of a center section so as to be fixedly positioned in the housing. In accordance with the invention, sliding resistance of the swash plate is reduced to improve the ability of the swash plate to return to the neutral position.

11 Claims, 9 Drawing Sheets

VARIABLE DISPLACEMENT TYPE HYDRAULIC SYSTEM

BACKGROUND OF THE INVENTION

1. Field of the Invention

The present invention relates to a support structure for movably operating a swash plate with reduced frictional resistance in a variable displacement type hydraulic system.

2. Description of the Related Art

A support structure for a sliding portion of a swash plate in a variable displacement type hydraulic system has been described in, for example, Japanese Utility Model Publication Gazette No. 61-28062. In this publication, a variable displacement type axial piston machine is constructed so that a convex surface is formed at the rear surface of a swash plate, a concave surface is formed at an inner wall of a housing opposite to the swash plate, and thrust metal of a substantially U-shape is fixed to the concave surface, so that the rear surface of the swash plate slides along a concave guide surface of a thrust metal.

However, since the swash plate is constantly subjected to thrust from pistons, frictional resistance generated between the rear surface of the swash plate and the guide surface of the thrust metal becomes greater. Thus, the sliding resistance of the swash plate is greater, thereby requiring a greater force to operate the swash plate. Friction is an important consideration, especially in the type of structure where the swash plate is spring biased to rotatably return to the neutral position. If the sliding resistance overcomes the biasing force of the spring, the swash plate will not return to the neutral position. Also, polishing the rear surface of the plate in contact with the thrust metal will not reduce the sliding resistance.

SUMMARY OF THE INVENTION

An object of the invention is to provide a support structure for a variable displacement type hydraulic system. A housing for the variable displacement type hydraulic system contains a rotatable cylinder block having a plurality of pistons freely movable in reciprocation. A swash plate abuts against heads of the pistons. A control shaft is provided for slantingly moving the abutting surface of the swash plate with respect to a rotary axis of the cylinder block. In accordance with the present invention, the swash plate is provided at its two side surfaces with guides. The guides are fitted into inner rings of roller bearings fixedly positioned within the housing. Accordingly, the swash plate is supported such that the sliding resistance is reduced and such that the swash plate can quickly return to a neutral position. The hydraulic system in accordance with the invention is inexpensive to produce and simple to assemble.

The above and further objects and novel features of the invention will be more fully apparent from the detailed description when the same is read in connection with the accompanying drawings.

BRIEF DESCRIPTION OF THE DRAWINGS

Preferred embodiments of the invention will be described in detail with reference to the following drawings in which the reference numbers refer to like elements and wherein.

DETAILED DESCRIPTION OF PREFERRED EMBODIMENTS

Figure 1:
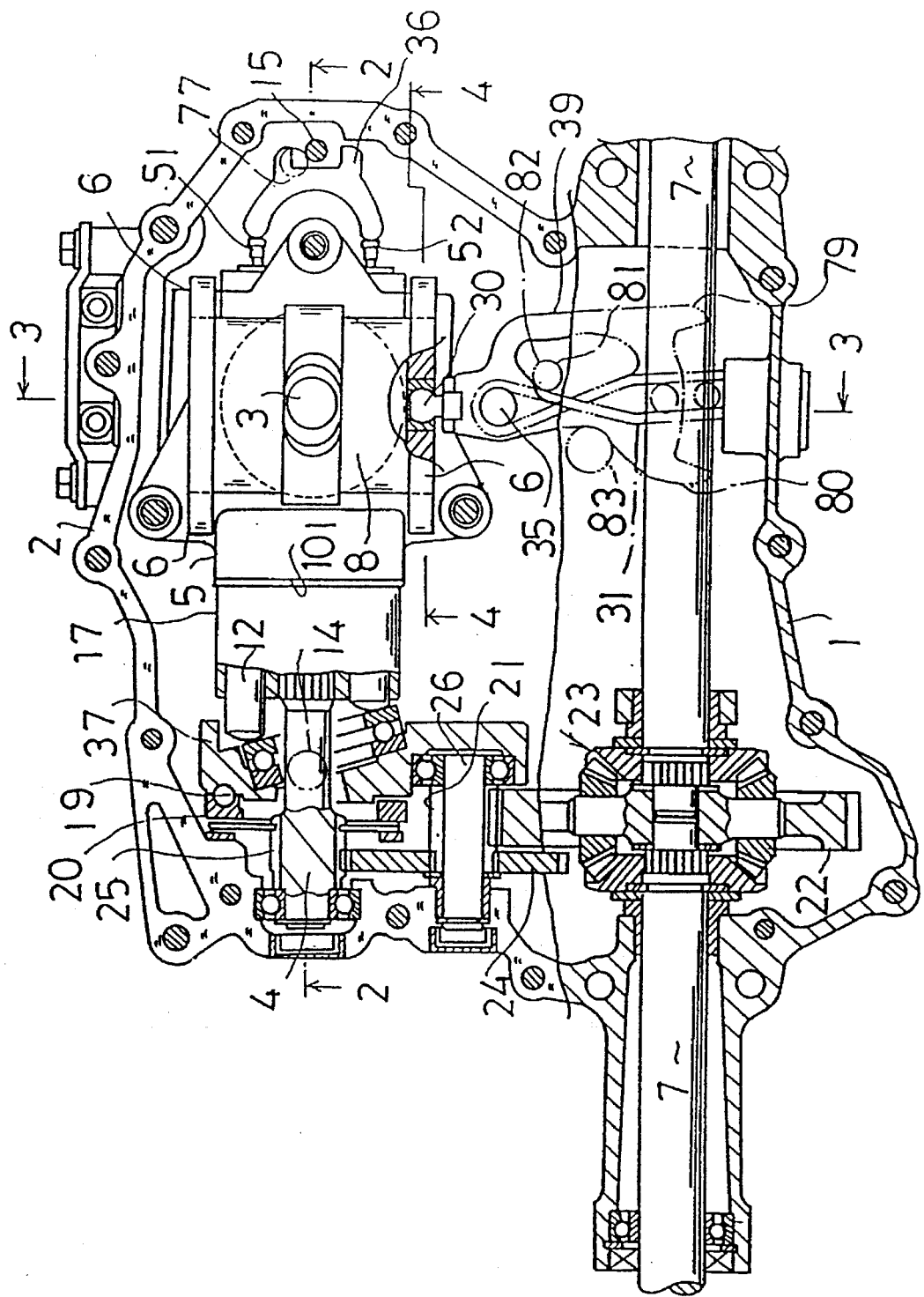
FIG. 1 is a plan view of an axle driving apparatus provided with a variable displacement type hydraulic system, from which an upper half of a housing of the axle driving apparatus is removed, and a partially broken-away view thereof.

FIGS. 1, 2, 3 and 4 show an exemplary embodiment of an axle driving apparatus, however, the invention is applicable to all types of axle driving apparatus. A housing of the axle driving apparatus includes sections, for example, halves, such as an upper half 1 and a lower half 2. The upper half 1 and lower half 2 are joined to form a joint, for example, a horizontal joint. The housing includes an oil sump. Axes of an output shaft 4 and a counter shaft 26 are included in the joint of the upper half 1 and lower half 2 of the housing. Bearings are provided in the joint for supporting the shaft 4 and the countershaft 26. A pair of axles 7 are rotatably supported in the housing, for example, in the upper half 1 of the housing and disposed relative to the joint, for example, above the joint of the upper half 1 and the lower half 2. The axles 7 are differentially jointed by a differential gear 23 in the housing and outwardly extend from the housing.

At a portion of the upper half 1 of the housing, for example, a portion where the differential gear 23 is disposed, is an upwardly enlarged portion, which is used as an oil tank 1a. On an upper surface of an oil tank 1a are a breather 59 and an oil observation plug 50. Also, a shaft 3 for driving a hydraulic pump, discussed in detail in the following, projects vertically upwardly from the upper half 1 of the housing. An engine (not shown) serves as an input to drive the shaft 3.

Figure 2:
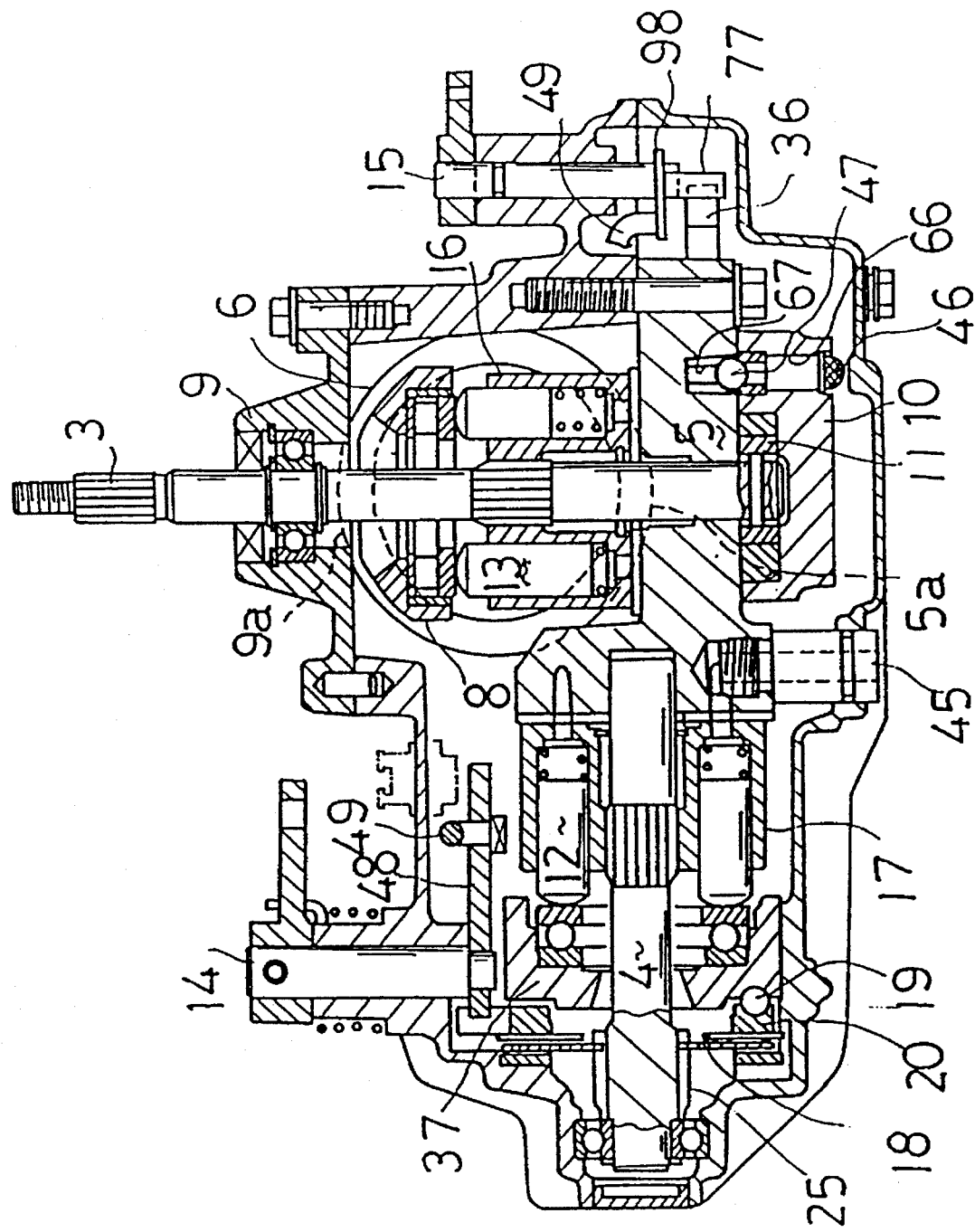
FIG. 2 is a sectional view looking in the direction of the arrows 2—2 in FIG. 1.
Figure 3:
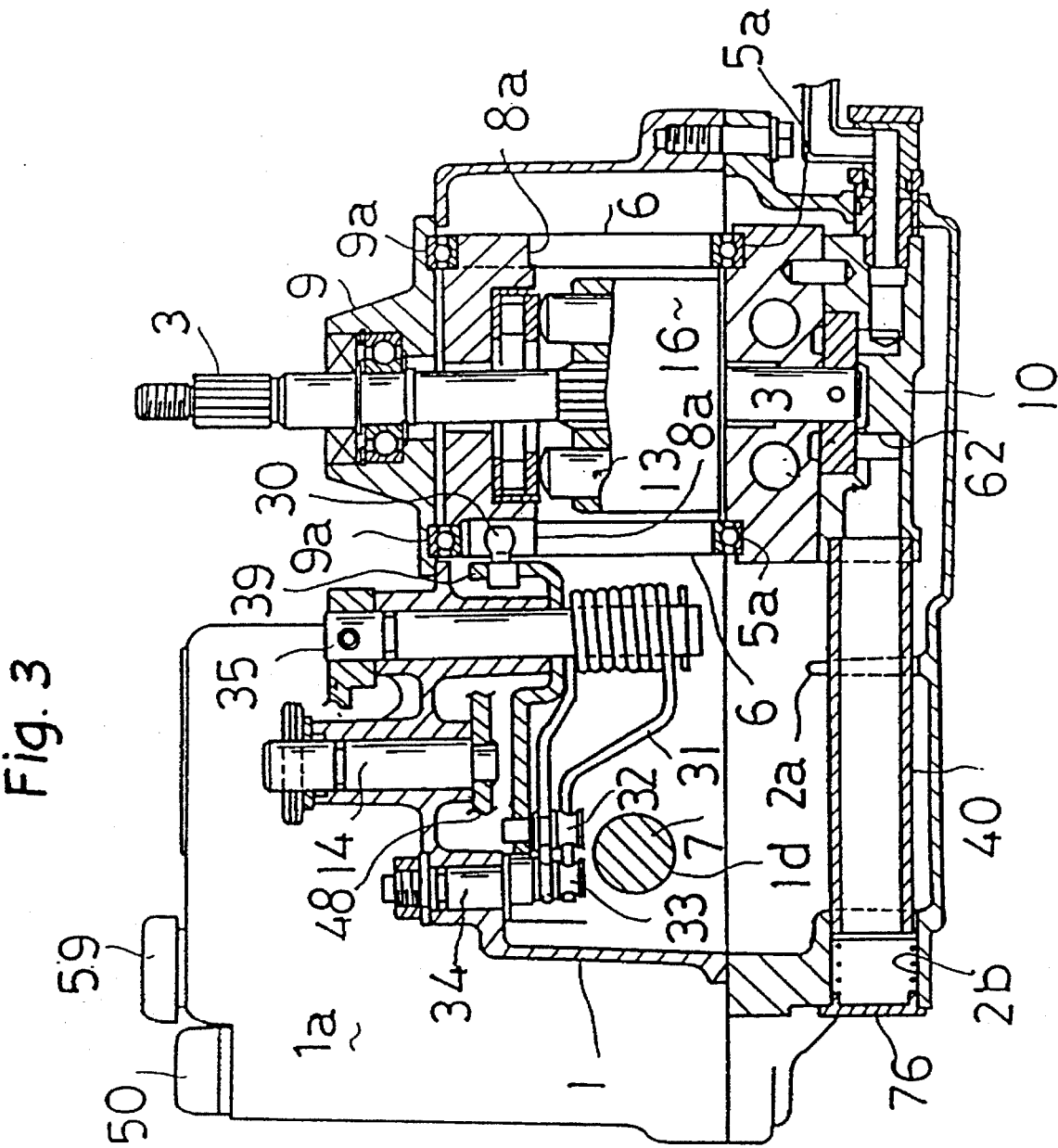
FIG. 3 is a sectional view looking in the direction of the arrows 3—3 in FIG. 1.

A center section 5 has a generally L-like shape when viewed from one side, for example, a lateral side as shown in FIG. 2. The center section is mounted in the upper half 1 of the housing. A surface, for example, an upper horizontal surface of the center section 5 is preferably positioned in a same plane as a plane defined by the joint or in a plane parallel to the plane defined by the joint. An upper horizontal surface, of the center section 5 comprises a pump setting surface 100. A cylinder block 16 for a hydraulic pump is rotatably and slidably disposed on the pump setting surface. Pistons 13 are disposed for reciprocating movement through springs in a plurality of cylinder bores in the cylinder block 16. In the vicinity of, for example, above the cylinder block 16 is a swash plate 8, which is slantingly movable, for example, laterally slantingly movable. The input shaft 3 is inserted through the swash plate 8. At a surface, for example, a lower surface of the swash plate 8 is a thrust bearing surface or an abutting surface against which heads of the piston 13 abut for slantingly operation of the swash plate 8. The swash plate is slantingly movable with respect to a rotary axis of the cylinder block 16. The operation of the swash plate 8 changes a discharge amount and discharge direction of oil from the hydraulic pump.

A vertical side surface of the center section 5 perpendicular to the upper horizontal surface of the center section 5 comprises a hydraulic motor mounting surface 101. A cylinder block 17 is rotatably slidably mounted on the hydraulic motor mounting surface 101. Pistons 12 are disposed for reciprocating movement through springs in a plurality of cylinder bores in the cylinder block 17. Heads of the pistons 12 abut against a slant surface (or a thrust bearing surface) of fixed swash plate 37. The fixed swash plate 37 is substantially fixedly sandwiched between the upper half 1 and the lower half 2 of the housing. The output shaft 4 engages with the cylinder block 17. This assembly comprises an embodiment of the hydraulic motor of a fixed displacement type hydraulic system. Within the center section 5 is a closed circuit for connecting suction ports and discharge ports of the hydraulic pump and motor, respectively, to circulate oil. The cylinder block 17 in the hydraulic motor receives pressurized oil discharged from the cylinder block 16 of the hydraulic pump and rotates to obtain stepless output rotation by the output shaft 4, thereby comprising a hydrostatic transmission.

A pump casing 10 is mounted on a lower surface of a horizontal portion of the center section 5. A trochoid charge pump 11 is disposed in the pump casing 10 and driven by an end, for example, a lower end of the input shaft 3 projecting, for example, downwardly projecting from the lower surface of the center section 5. An intake oil passage 62 of the charge pump 11 is open into an oil pump through an oil filter 40. An operating oil supply circuit is connected to the closed circuit at the center section 5. The operating oil supply circuit has a pair of check valves (not shown). The pressurized oil discharged from the charge pump 11 opens the check valves for being supplied to the closed circuit. In addition, within the pump casing 10 is a relief valve (not shown) for adjusting the pressure of the oil discharged from the charge pump 11. The oil filter 40 is formed of a cylindrical porous material and supported between a side wall of the pump casing 10 and an inner wall of the lower half 2 of the housing. Accordingly, when the oil filter 40 is checked, cleaned or exchanged, a blind lid 76 is removed to allow the oil filter 40 to be extracted through an opening 2b at the lower half 2 of the housing. A support base 2a for guiding and supporting the oil filter 40 projects from an inner bottom of the lower half 2 of the housing.

At the lower surface of the center section 5 is an oil charge pipe 45, an extreme end of which projects from the lower surface of the center section 5 and is plugged. The oil charge pipe 45 is used for charging oil into the closed circuit after the hydraulic pump and hydraulic motor are built in the housing.

Also, in the center section 5 is an intake oil passage 66 for another check valve 47. Check valve 47 is open so that the oil taken into the housing through oil filter 46 is taken into the negative pressure side of the closed circuit from an oil passage 67.

As shown in FIGS. 1 and 2, opening push rods 51 and 52, which allow opening of the pair of check valves (not shown) from the exterior of the housing, are provided at the center section 5. A by-pass operation member 36 of a substantially C-shape is provided adjacent to both the rods 51 and 52. The by-pass operation number 36 simultaneously pushes both of the opening push rods 51 and 52 to open both the check valves and to open the closed circuit in the oil sump to enable the hydraulic motor to freely rotate. A by-pass operation lever shaft 15 is rotated from the exterior so that a cam pin 77 fixed to the by-pass operation lever shaft 15 simultaneously presses the opening push rods 51 and 52 to open the check valves, thereby enabling the hydraulic motor to freely rotate.

An arm 98 is fixed to a portion, for example, a lower portion of the by-pass operation lever shaft 15. The arm 98 and an arm 48 fixed to a brake operating shaft 14, discussed below, are connected by a rod 49. As discussed below, the brake operating shaft 14 rotates a brake actuator 20 to brake the output shaft 4. During such breaking operation, the by-pass operation member 36 is operated to automatically close the check valves 53 and 54 if there is an attempt to open the pair of check valves 53 and 54.

The output shaft 4 is provided with an indented gear 25, which engages with a larger diameter gear 24 integral with the counter gear 26, and a smaller diameter gear 21 integral therewith engages with a ring gear 22 at the differential gear 23. Accordingly, power from the hydraulic motor transmitted to the ring gear 22 is transmitted to the left and right axles 7 through the differential gear 23. In addition, the counter shaft 26 is journalled at one end to the side wall of the fixed swash plate 37. The arm 48 fixed to the brake operating shaft 14 engages with a projection on the brake actuator 20. The brake actuator 20 is annular and is supported rotatably around the axis of the output shaft 4. Accordingly, when the brake actuator 20 is rotatably operated by the arm 48, a cam ball 19 interposed between the fixed swash plate 37 and the brake actuator 20 moves the brake actuator 20 toward a braking friction plate 18 fixed to the output shaft 4. Thus, the braking friction plate 18 is sandwiched between the brake actuator 20 and the fixed swash plate 37, thereby exerting a braking action to the output shaft 4.

A speed change arm 39 fixed to a control shaft 35, discussed below, is provided with a cam bore 82 for returning the swash plate 8 to the neutral position when the brake operating shaft 14 is rotated to brake the output shaft 4. A pin 81 is inserted into the cam bore 82 and rotatably fixed to one end of an arm around a relay shaft 83. When the braking action is exerted, as discussed above, the arm rotates around the relay shaft 83 by an interlocking link between the arm and the brake operating shaft 14 so that the pin 81 moves in the cam bore 82 to forcibly return the speed change arm 39 to the neutral position. When not-braking, the pin 81 is disposed in a wider portion of the cam bore 82 so that the speed change arm 39 can freely rotate.

Figure 4:
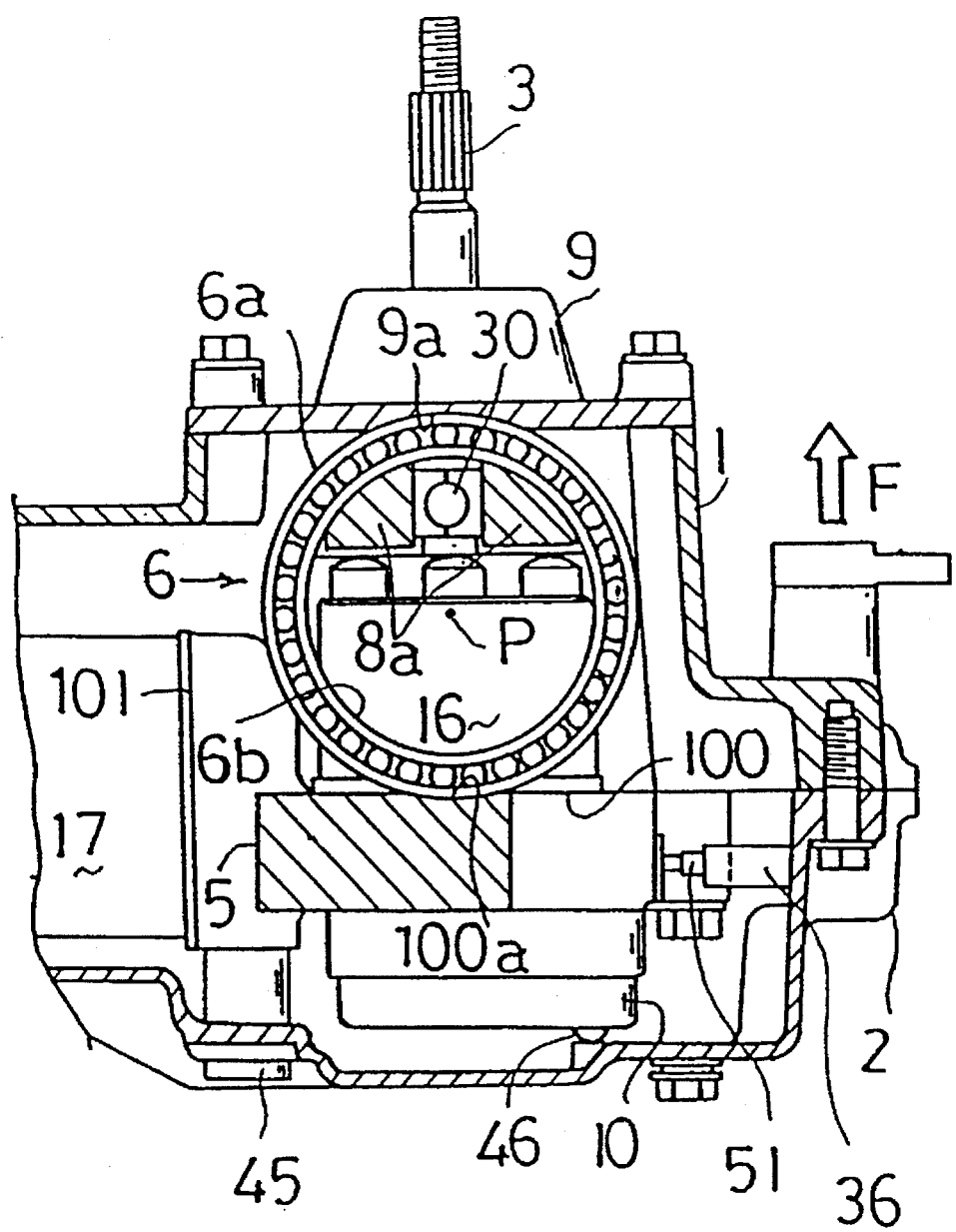
FIG. 4 is a sectional view looking in the direction of the arrows 4—4 in FIG. 1.
Figure 5:
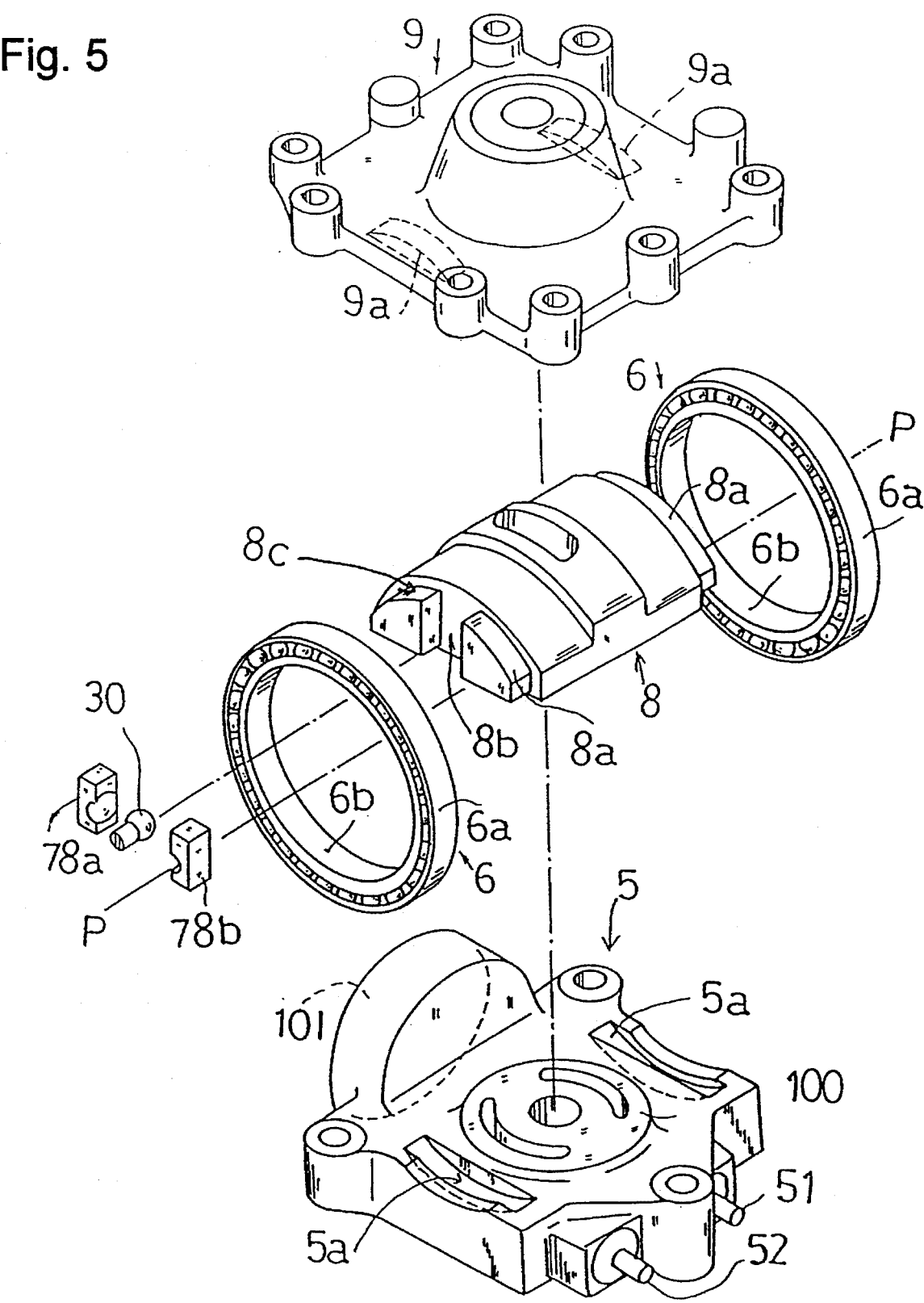
FIG. 5 is an exploded perspective view of a portion of FIG. 4.
Figure 6:
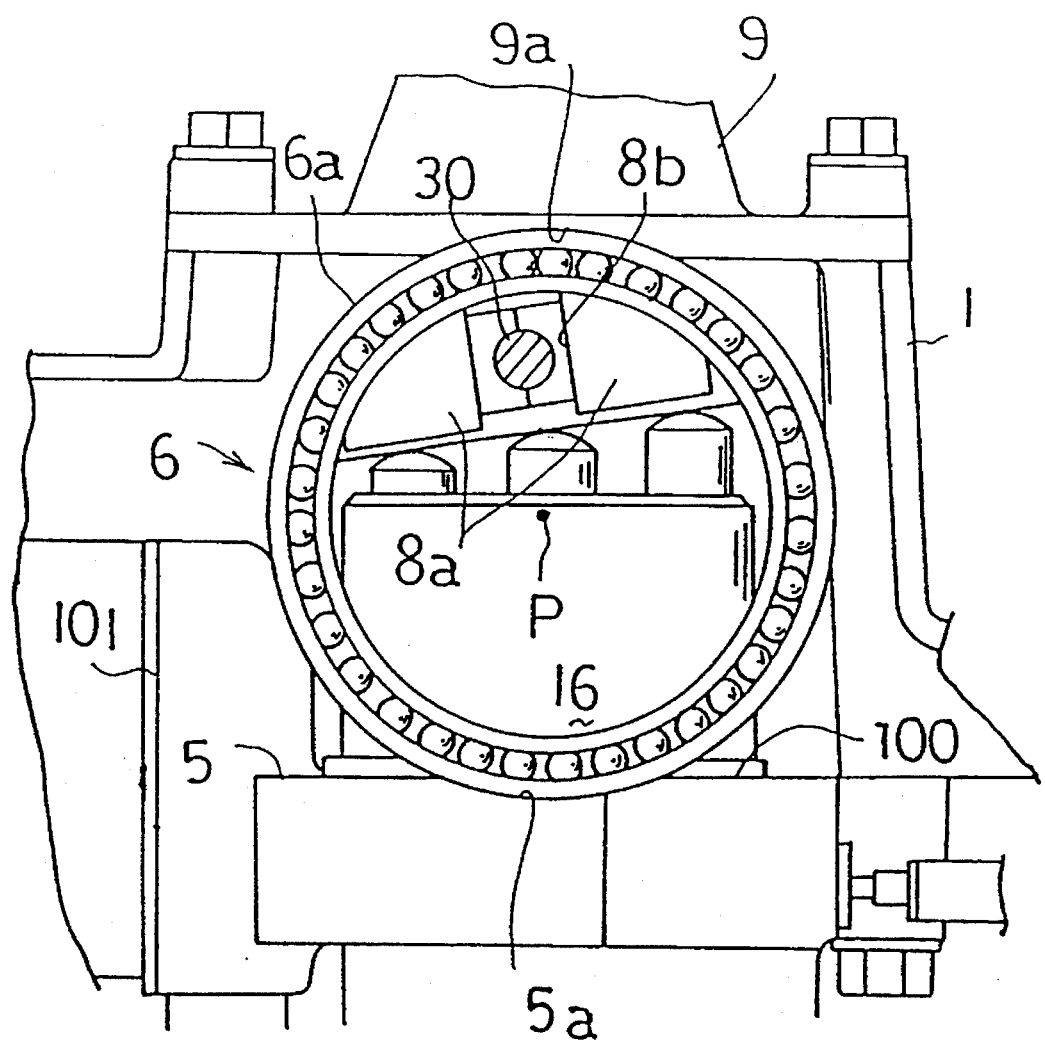
FIG. 6 is an enlarged sectional view of a portion of FIG. 4 showing a state of slanting movement of the swash plate.

FIGS. 4, 5 and 6 show the swash plate 8 having side surfaces, preferably, both side surfaces with guides 8a, which are preferably integral with the side surfaces. In the embodiment shown, for example, in FIG. 5, guides 8a include an arcuate portion of a cylindrical shape. One of the guides 8a has a groove 8b for being connected to a control shaft 35, discussed below. The groove 8b divides the guide 8a into halves. In another embodiment, shown in FIG. 7, discussed in greater detail below, guides 8a', are formed in a cylindrical shape on movable swash plate 8. One of the guides 8a' has a groove 8b' for being connected to the control shaft 35. The groove 8b' divides the one of the guides 8a' into semi-cylindrical portions. A center of curvature of each of the guides 8a or 8a' coincides with the axis P of slanting movement of the swash plate 8 in the housing. In addition, in one embodiment, when the swash plate 8 is molded, the mold is shaped to include guides 8a or 8a'. Thus the swash plate 8 and guides 8a or 8a' are integral, thereby lowering manufacturing and processing costs.

At both the side surfaces of the swash plate 8 in the housing are provided a pair of annular roller bearings 6 each having an inner ring 6b and an outer ring 6a. The roller bearings 6 are fixed between the inner walls, for example, two opposite inner walls of the housing. A pair of circular-arc-shaped grooves 9a are provided on an inner surface of a wall of a lid 9. The lid 9 is for closing an opening in a wall, for example, an upper wall of the upper half 1 of the housing. A pair of circular-arc-shaped grooves 5a are provided on the upper horizontal surface of the center section 5 fixed in the upper half 1 of the housing to mount the cylindrical block 16, so that both the grooves 9a and 5a are opposite to each other and the outer rings 6a of the roller bearings 6 are fixed between the grooves 9a and 5a. In one embodiment, the roller bearings 6 are radial bearings and use single row ball bearings. Other embodiments include, for example, cylindrical roller bearings, tapered roller bearings or needle roller bearings.

The roller bearings 6 are fixed in the housing. The guides 8a or 8a' of the swash plate 8 are fitted into the inner rings 6b of the roller bearings 6 fixed in the housing. Accordingly, resistance is reduced when the swash plate 8 is slantingly movably operated, resulting in easier operation. As discussed below, in the embodiment where a mechanism for restoring the swash plate 8 to the neutral position is provided, the swash plate 8, upon stopping its slanting movement, quickly returns to the neutral position. Since the roller bearings 6 are immersed into oil in the oil sump in the housing and always lubricated, the sliding resistance generated between the outer ring 6a and the inner ring 6b is significantly reduced.

In the embodiment shown in FIG. 5, each guide 8a provided on the swash plate 8 is preferably a portion of a cylindrical shape and has a circumferential length smaller than that of an inner circumference of the inner ring 6b of roller bearing 6. A circular-arc portion of the guide 8a, which is subjected to a thrust F from pistons 13, abuts against the inner ring 6b of the roller bearing 6. Since the swash plate 8 is constantly subjected to the thrust F for pivoting the swash plate 8, each of guides 8a of the swash plate 8 closely contacts the inner ring 6b without substantially any play. Thus, improved sliding is achieved. Guides 8a are advantageous because swash plate 8 can be smaller and therefore lighter. Thus, a process for manufacturing the swash plate 8 is easier.

Figure 7:
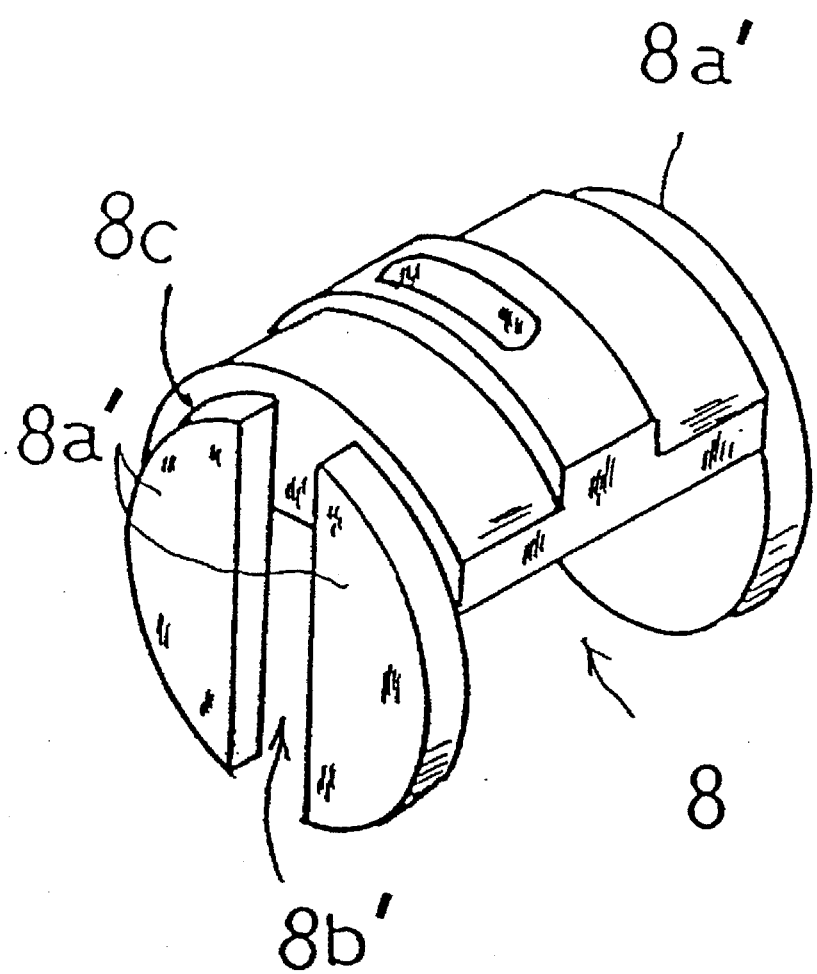
FIG. 7 is a structural view of a modified embodiment of the swash plate.

In addition, in another embodiment shown in FIG. 7, the swash plate 8 may be of a larger size by being provided with guides 8a'. Accordingly, guides 8a' can be made substantially equal in circumference to the inner circumference of the inner ring 6b, which can improve the strength for holding the swash plate 8.

Between the inner ring 6b and the guides 8a or 8a', it is unnecessary to use a pin or the like for locking because both the inner ring 6b and the guides 8a or 8a' are allowed to rotate relative to each other. Thus, the frictional resistance generated when the swash plate 8 slantingly moves, can further be reduced. Also, a radius of each guide 8a or 8a' can be somewhat smaller than a radius of the inner ring 6b to reduce frictional resistance. This embodiment simplifies the assembly of the swash plate 8 and reduces production expense.

Figure 9:
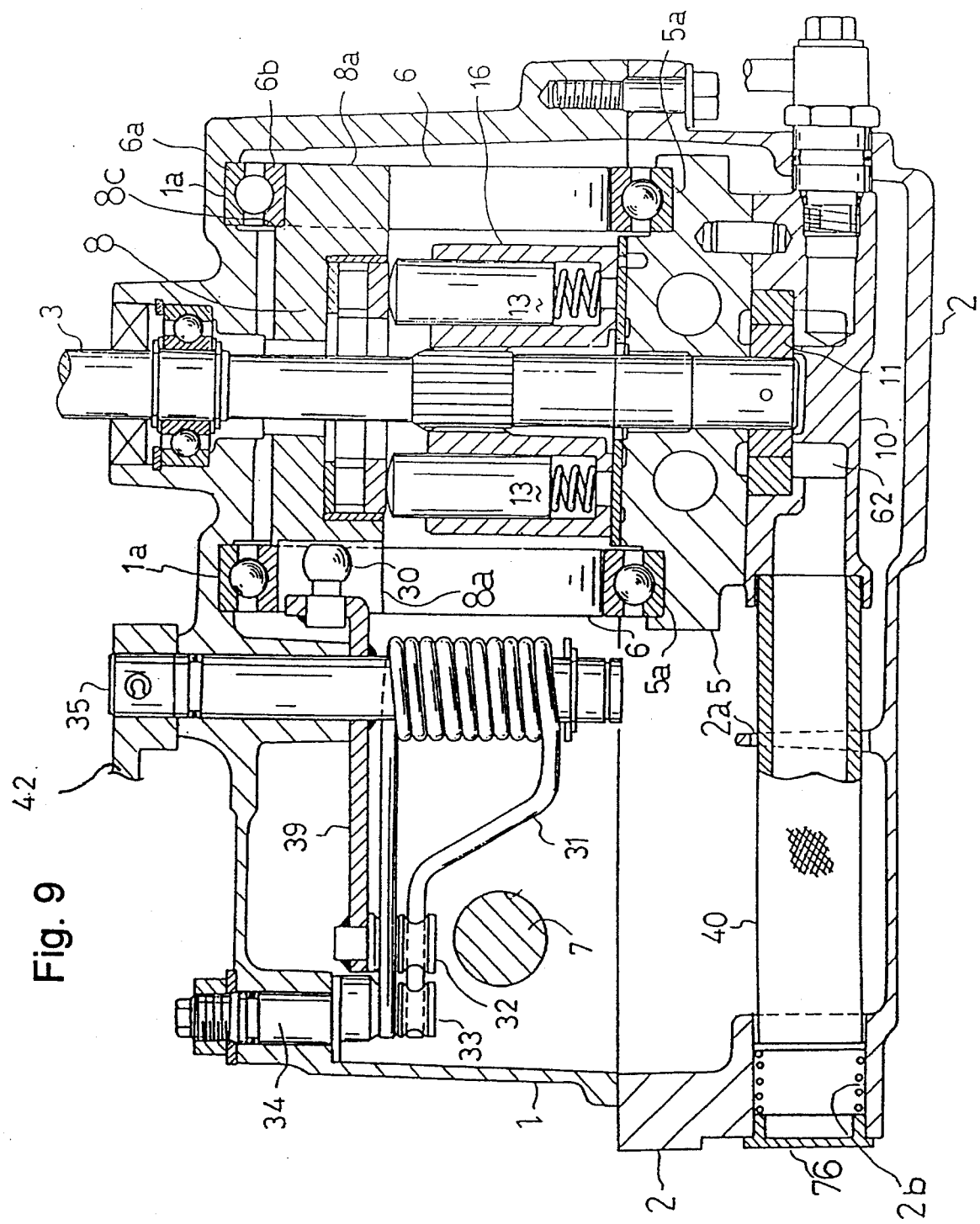
FIG. 9 is a view showing another embodiment of a support structure for the swash plate.

As discussed above, in the embodiment where the roller bearings 6 are fixed, for example, vertically and laterally fixed in the circular-arc-shaped grooves 9a and 5a, the swash plate 8 together with the roller bearings 6 is very simply built in the housing. In addition, the lid 9, as shown in FIG. 9, may be integral with the upper half 1 of the housing, in which the circular-arc-shaped grooves 1a are provided at the inner surface of the upper wall of the upper half 1 of the housing.

The center section 5 may be an independent component which is mounted at a side of the upper half 1 of the housing or at a side of the lower half 2 of the housing. In the embodiment where the center section 5 is mounted on the side of upper half 1 of the housing, the outer ring 6a of each roller bearing 6 can be fitted in part into the grooves 5a at the center section 5 so as to temporarily support the swash plate 8 above the cylinder 16. Then, the outer ring 6a is fitted into the groove 1a, and the center section 5 is mounted to the upper half 1 of the housing, thereby easily finishing the construction of the assembly.

A width or thickness of the guides 8a or 8a' is smaller than a width of each roller bearing 6. A groove 8b or 8b' is formed at an end surface of one of the guides 8a or 8a'. The groove 8b or 8b' is for being connected with a control shaft 35, discussed below.

The control shaft 35 is attached to the upper wall of the upper half 1 of the housing and is rotatable and extends in parallel to the input shaft 3. An arm 42 is fixed to the control shaft 35 at a portion positioned at the exterior of the housing, and is connected with a manual operation tool, such as pedals or a lever, at the vehicle. An L-shaped speed change arm 39 is fixed to the control shaft 35 at a portion in the housing. A projection 30 of a ball-like shape at an end, for example, an extreme end is provided at a portion of the speed change arm 39 along the control arm 35. The projection 30, to which joint blocks 78a and 78b are mounted, is fitted into the groove 8b on the swash plate 8, thereby connecting the control shaft 35 to the swash plate 8.

When the control shaft 35 rotates to move, for example, horizontally move the projection 30, a force from the projection 30 is transmitted to the groove 8b through the joint blocks 78a and 78b, so that the swash plate 8 is laterally slanted around the axis P of slanting movement.

Since the projection 30 engages with the groove 8b in the inner ring 6b of the roller bearing 6, the control shaft 35 can be disposed in close proximity with the swash plate 8 to achieve compactness.

A coiled torsion spring 31 has a portion that is wound on the control shaft 35. The torsion spring 31 has ends extending in parallel to each other and crossing, for example, halfway of the ends so as to sandwich therebetween a fixed pin 33 mounted on the housing and a movable pin 32 mounted on the speed change arm 39. Accordingly, a biasing force of the torsion spring 31 acts on the swash plate 8 to be positioned in the neutral position through the movable pin 32 and speed change arm 39. The fixed pin 33 is eccentrically mounted to an end, for example, a lower end of a screw bolt 34. Screw bolt 34 is mounted to the upper wall of the upper half 1 of the housing so that the screw bolt 34 is moderately screwed to enable the fixed pin 33 to be adjusted in position, and thus the neutral position of the swash plate 8 can be accurately adjusted.

Figure 8:
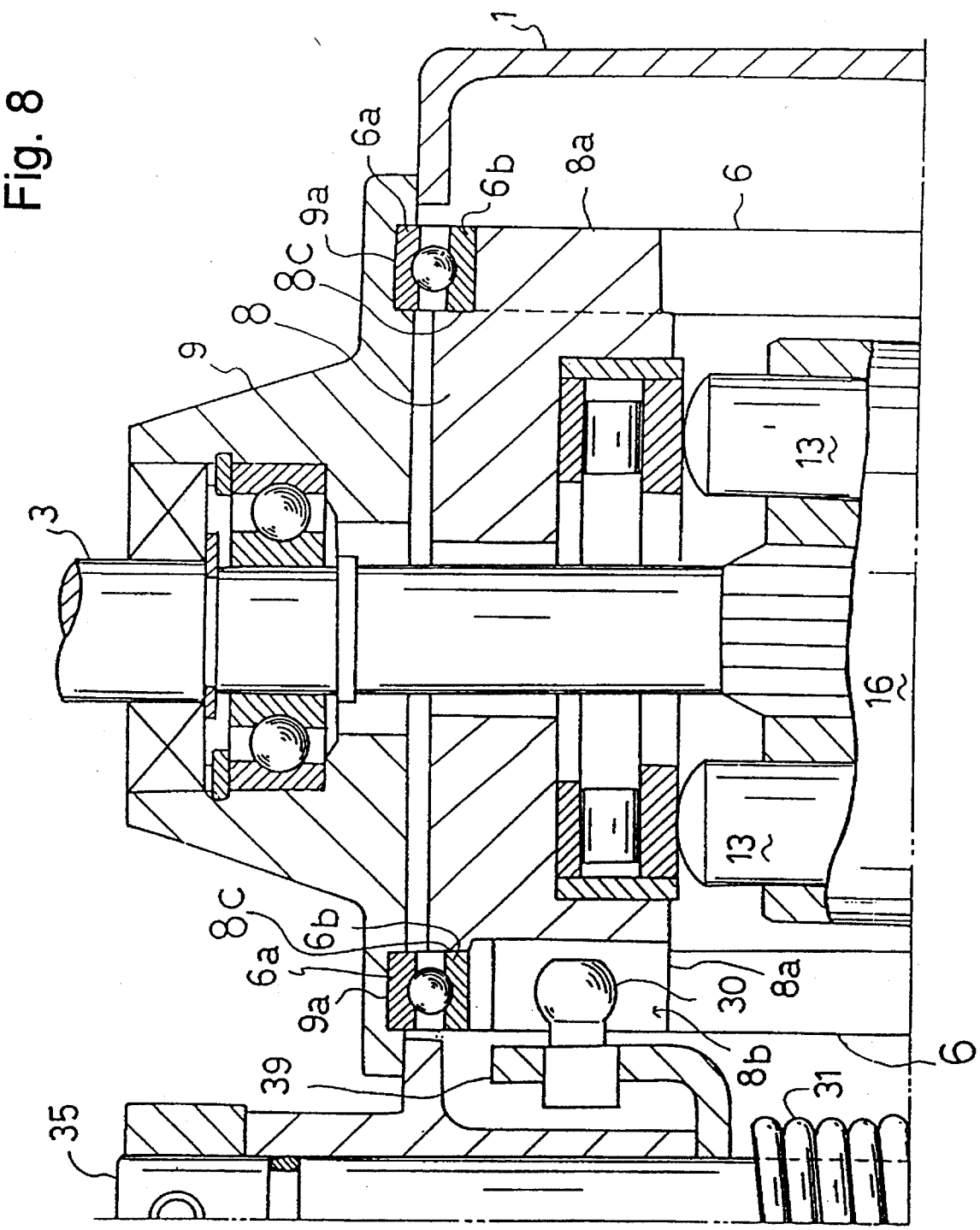
FIG. 8 a partially enlarged sectional view of the swash plate portion of FIG. 3.

As shown in FIG. 8, a stepped portion 8c is formed between the guides 8a and the swash plate 8. A side surface of the inner ring 6b of each roller bearing 6 abuts against a side surface of the stepped portion 8c. Thus, the swash plate 8 can be prevented from laterally moving due to the roller bearing 6. The inner ring 6b of each roller bearing 6, even though abutting against the stepped portion 8c, rotates integrally with the swash plate 8, thereby not generating friction resistance when the swash plate 8 slantingly moves.

While a preferred embodiment of the invention has been described using preferred embodiments and specific terms, such description is for illustrative purposes only, and it is to be understood that changes and variations may be made without departing from the spirit or scope of the invention and following claims.

What is claimed is:

1. A hydraulic system, comprising:

a housing;

a variable displacement hydraulic unit contained in said housing, said hydraulic unit being provided with a rotatable cylinder block having a plurality of pistons movable in reciprocation and a swash plate having an abutting surface for abutting against heads of said pistons and an axis of slanting movement;

operating means for controllably slantingly moving said abutting surface of said swash plate with respect to a rotary axis of said cylinder block; and a roller bearing fixedly positioned in said housing having an inner ring with an inner circumference, said swash plate including a guide on a side surface thereof having a circumference smaller than said inner circumference of said inner ring of said roller bearing such that a size and weight of said swash plate is reduced, said guide being fitted within said inner ring for slantingly movably supporting said swash plate in a slantingly movable position within said housing, wherein a center of radius of curvature of said guide coincides with the axis of slanting movement of said swash plate.

2. A hydraulic system according to claim 1, wherein said guide is rotatably fitted into said inner ring of said roller bearing.

3. A hydraulic system according to claim 1, wherein said guide comprises a pair of guides provided on side surfaces of said swash plate, and said roller bearing comprises a pair of said roller bearings with inner rings, each of said guides being fitted in each of said roller bearings.

4. A hydraulic system according to claim 1, further comprising:

a stepped portion between said guide and said side surface of said movable swash plate, said stepped portion having a surface for abutting a side surface of said inner ring of said roller bearing.

5. A hydraulic system according to claim 1, further comprising:

another displacement hydraulic unit contained in said housing comprising a hydrostatic transmission, and axles contained in said housing, wherein said variable displacement hydraulic unit is in fluid communication with said displacement hydraulic unit comprising said hydrostatic transmission, said axles being driven by said hydrostatic transmission.

6. A hydraulic system according to claim 1, wherein said guide comprises a portion of a cylindrical shape.

7. A hydraulic system, comprising:

a housing;

a variable displacement hydraulic unit contained in said housing, said hydraulic unit having a rotatable cylinder block having a plurality of pistons movable in reciprocation and a swash plate having an abutting surface abutting against heads of said pistons and an axis of slanting movement;

operating means for controllably slantingly moving the abutting surface of said swash plate with respect to a rotary axis of said cylinder block, said swash plate including a guide on a surface of said swash plate, a center portion of a radius of curvature of said guide coinciding with the axis of slanting movement of said swash plate;

a roller bearing having an inner ring, said guide being fitted in said inner ring of said roller bearing; and fixing means for mounting said roller bearing in said housing, said fixing means comprising two members separably mounted, said roller bearing being fixedly sandwiched between said two members, wherein one of said two members is a center section for rotatably and slidably mounting said cylinder block, and wherein said roller bearing supports said swash plate in a slantingly movably position.

8. A hydraulic system according to claim 7, wherein another of said two members is a lid for closing an opening of said housing.

9. A hydraulic system according to claim 7, wherein part of said outer ring of said roller bearing is fitted in a groove in an inner wall of said two members.

10. A hydraulic system, comprising:

a housing;

a variable displacement hydraulic unit contained in said housing, said hydraulic unit having a rotatable cylinder block having a plurality of pistons each movable in reciprocation;

a swash plate having an abutting surface abutting against heads of said pistons;

a control shaft for controllably slantingly moving the abutting surface of said swash plate with respect to a rotary axis of said cylinder block, said control shaft being rotatably supported to said housing and extending substantially parallel to said rotary axis of said cylinder block, a portion of said control shaft being in an interior of said housing;

an arm disposed on said portion of said control shaft for receiving an input force, said arm having a projection;

a pair of roller bearings fixed within said housing each having an inner ring; and a pair of guides each including an arcuate portion being disposed on a side surface of said swash plate, one of said pair of guides having a groove, wherein said arcuate portion of each of said pair of guides are fitted in each of said inner rings such that said roller bearings support said swash plate in a slantingly movably position, and wherein said projection projects within one of said inner rings of said roller bearings so as to engage with said groove of one of said pair of guides for slantingly moving said swash plate.

11. A hydraulic system according to claim 10, wherein said groove in said guides has a depth, such depth being substantially equal to a width of said roller bearing.

* * * * *